United States Patent [19]
Quazi

[11] Patent Number: 4,943,886
[45] Date of Patent: Jul. 24, 1990

[54] CIRCUITRY FOR LIMITING CURRENT BETWEEN POWER INVERTER OUTPUT TERMINALS AND GROUND

[75] Inventor: Fazle S. Quazi, Boulder, Colo.

[73] Assignee: Etta Industries, Inc., Boulder, Colo.

[21] Appl. No.: 308,515

[22] Filed: Feb. 10, 1989

[51] Int. Cl.$^5$ ............................................. H05B 41/29
[52] U.S. Cl. ...................................... 361/42; 307/326;
 315/119; 315/225; 363/37; 363/56
[58] Field of Search ................... 307/326, 327; 363/37, 363/56; 361/42; 315/119, 127, 209 R, 225

[56] References Cited
U.S. PATENT DOCUMENTS

| | | | |
|---|---|---|---|
| 4,127,893 | 11/1978 | Goepel | 363/37 |
| 4,392,087 | 7/1983 | Zansky | 363/56 |
| 4,461,980 | 7/1984 | Nilssen | 363/56 |
| 4,507,698 | 3/1985 | Nilssen | 363/56 |
| 4,563,719 | 1/1986 | Nilssen | 361/42 |
| 4,675,576 | 6/1987 | Nilssen | 363/56 |

Primary Examiner—William H. Beha, Jr.
Attorney, Agent, or Firm—Sixbey, Friedman, Leedom & Ferguson

[57] ABSTRACT

Circuitry for limiting a high frequency current through a load including a DC voltage source connected to a circuit ground; an inverter for converting the DC voltage to the high frequency current, the inverter being connected to circuit ground; a chassis containing the voltage source and the inverter where the chassis is connected to earth ground and where earth ground and circuit ground are at different electric potentials; sensing circuitry connected between earth ground and one of the output terminals of the voltage source to establish a current path from earth ground to the one output terminal of the voltage source to thus monitor any high frequency current which may flow through a person, for example, connected between one of the output terminals of the inverter and earth ground; and limiting circuitry for limiting the high frequency current through the person in response to the current through the person exceeding a predetermined limit.

17 Claims, 13 Drawing Sheets

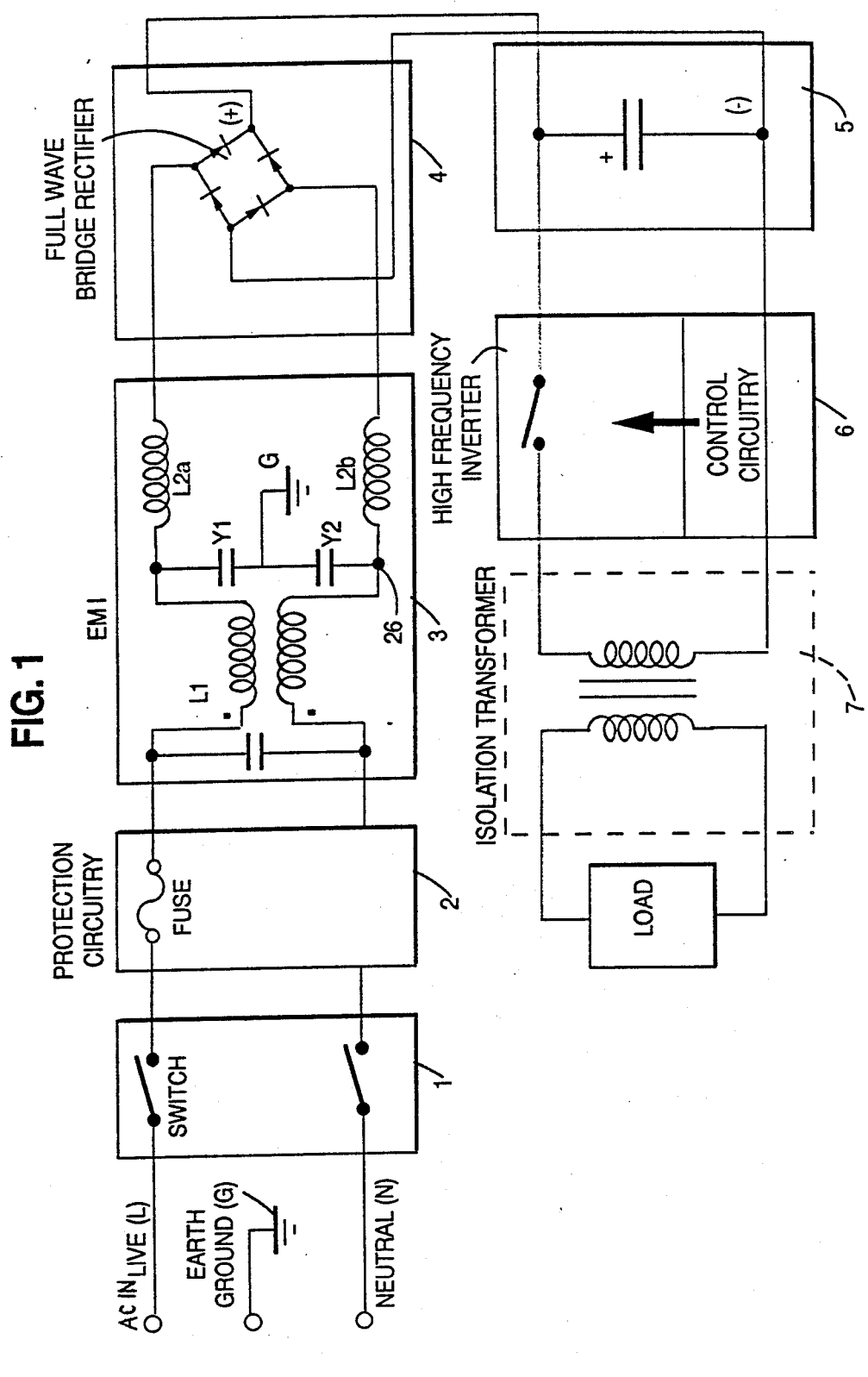

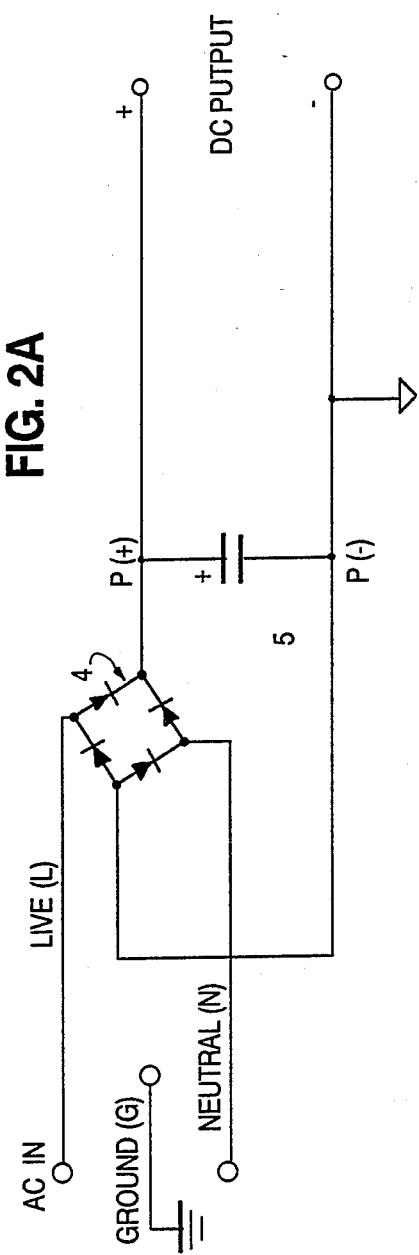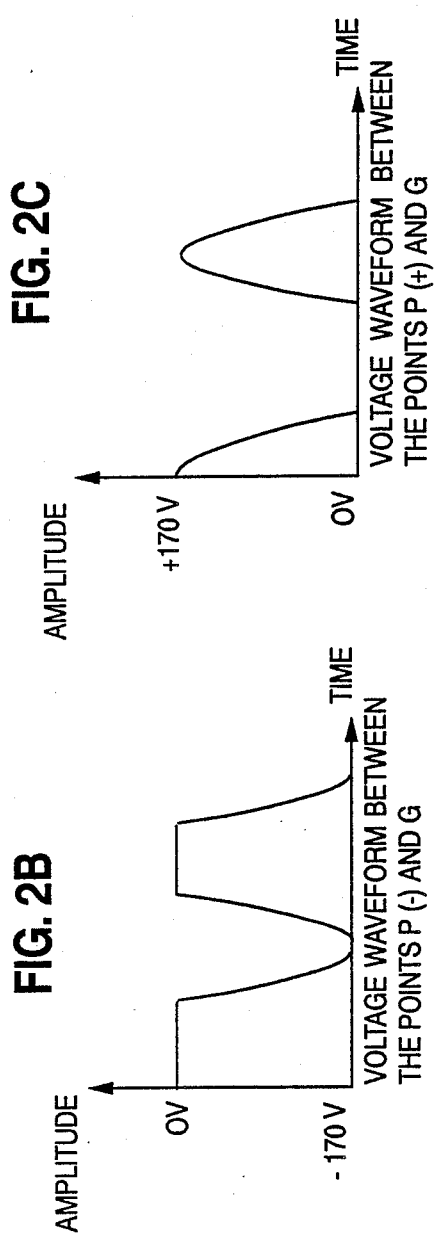

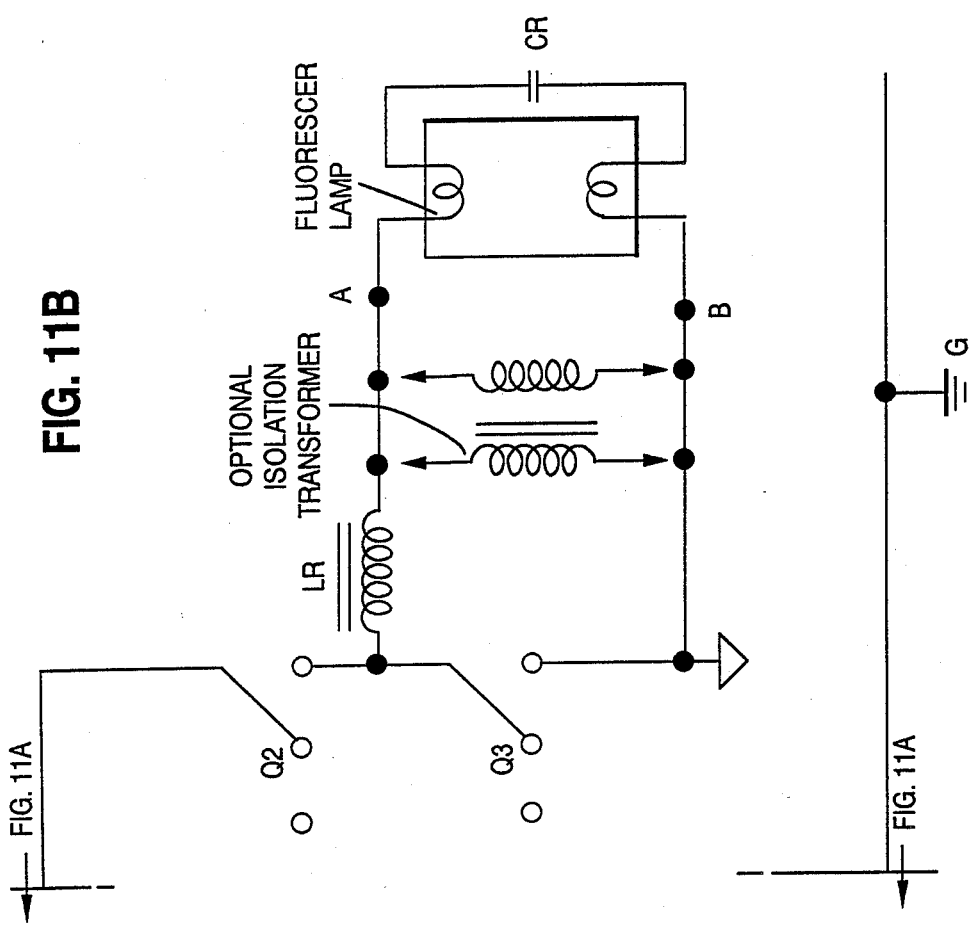

CIRCUITRY FOR LIMITING CURRENT BETWEEN POWER INVERTER OUTPUT TERMINALS AND GROUND

BACKGROUND AND SUMMARY OF THE INVENTION

Power inverters are commonly used in the electronics industry. An inverter's output terminal(s) typically are connected resistively or capacitively to ground or a grounded inverter case. Depending on the inverter's output voltage, frequency and amount of resistive and or capacitive coupling, a significant amount of high frequency current can flow between the inverter's output terminal(s) and ground. This can cause an electrical shock or a fire. The present invention prevents or limits the amount of current that can flow between a power inverter output terminal(s) and ground.

An off-line power inverter block diagram is shown in FIG. 1. 1 is an input section for AC power. 2 is a power line protection circuitry section which includes a fuse, etc. Conducted electro-magnetic interference (EMI) suppression circuitry is shown in the section 3. Here, L1 is a common mode inductor, L2a and L2b are differential mode inductors, Y1 and Y2 are equal value capacitors for limiting leakage current to earth ground where the values of Y are such the high frequency EMI generated by the inverter are shunted to earth ground while the lower frequency AC signal is not so shunted.

Section 4 is half or full wave rectification circuitry. Ripple voltage is filtered in section 5. The DC voltage is converted to a high frequency by a high frequency inverter and control circuitry. This is shown in the section 6. Section 7 is optional which is a high frequency transformer for voltage isolation, step-up, step-down or for multiple output secondary voltages.

In operation, potential difference between the neutral (N) AC line and the earth ground (EG) is very low. However, the potential difference between the live (L) AC line and the earth ground (EG) is the full AC voltage. For 120V AC input and for a full wave rectification case as illustrated in FIG. 2A, the voltage between the (+) lead and the earth ground, and voltage between the (−) lead and the earth ground are shown in FIGS. 2B and 2C, respectively.

High frequency power inverter circuitry 6 is often designed using commonly available switch-mode integrated circuits. For example, a block diagram of an off-line resonant inverter utilizing the integrated circuit (IC), SG2525 is shown in FIG. 3 and is indicated at 20. The combination of CT2 and RT2 determines the oscillator frequency of the IC. A resistor R4 is usually required between the terminals 15 and 13. The + Low Voltage connected to pin 15 may be derived from P (+) or an independent voltage source. A resistor divider R5 and R6 determines the amount of DC voltage applied to non-inverted terminal (pin 2) of an operational amplifier. This voltage, in turn, sets the magnitude of the duty cycle of the output pulses (pin 14 and pin 11). Depending on the requirements, an impedance Z2 is necessary between the inverted terminal (pin 1) and the compensation terminal (pin 9) of an error amplifier for loop stability of the IC.

Output signals from pin 11 and pin 14 periodically turn transistors Q2 and Q3 on and off. Thus, when Q2 is on, Q3 is off, and when Q2 is off, Q3 is on. During the time when Q2 is on, energy flows through Q2 and the resonant inductor LR to charge the resonant capacitor CR. Then, when Q2 is off but Q3 is on, stored energy from CR flows back through LR and Q3. Under this arrangement, if the pulse repetition frequency of the pulses at pins 11 and 14 is identical with the resonance frequency of the LC (LR and CR) network, then the circuit functions as a resonant inverter.

An off-line high frequency power inverter can also be constructed using power inverter topology other than resonant inverter topology. For example, push-pull topology, half bridge topology, etc.

The resonant inverter can drive a load like a fluorescent lamp as described by U.S. Patent application Ser. No. 147,574 filed Jan. 19, 1988 by Fazle S. Quazi which is assigned to the assignee of the subject application and which is incorporated herein by reference. During installation or removal of a lamp, a person can accidentally be in contact with terminal A and the grounded inverter case simultaneously where the fluorescent lamp would be out of contact with contact A as indicated in FIG. 3. In this situation, the person can be replaced by an equivalent resistor Rp of 500 ohms. According to Underwriters Laboratories Inc., USA, safety standards UL 935, Paragraph 20.5, when a 500 ohms resistor is placed between the terminal A and ground, the maximum acceptable peak current through the 500 ohms resistor must be limited to 43.45 milliamperes, when the inverter frequency is 10,000 Hertz or more. This corresponds to a maximum peak voltage of 21.7 volts across the 500 ohm resistor.

If the voltage across the person rises above 21.7 volts, this may be dangerous and thus, in accordance with the invention, means are provided for detecting this voltage and for taking appropriate steps when the voltage rises to 21.7 volts or any other voltage at which appropriate action should be taken.

Returning to FIG. 3, when a resistor Rp is placed between the inverter output terminal A or B and ground, current will flow between them. The magnitude of current flow will depend primarily on the following:

(a) with respect to ground, the magnitude of the high frequency AC voltage that appears at the terminal A or B;
(b) the value of the resistor (Rp) placed between A or B and ground;
(c) the amount of parasitic capacitive coupling (Cp) between high-frequency circuitry, wires and grounded case, as discussed below and illustrated in FIG. 4; and
(d) the values of the Y capacitors used in the EMI section 3.

In the case of a transformer isolated load, the current flow will be determined by the construction of the transformer. For example, electrostatic shielding between primary and secondary winding, capacitive coupling (Cw) between these two windings, etc., will play major roles.

Possible current flow paths between the terminals A or B and the ground G are shown in FIGS. 4 and 6 where FIG. 6 includes an isolation transformer placed between the inverter output and the load. FIGS. 5 and 7 are simplified schematics of FIGS. 4 and 6, respectively. In these simplified cases, the effects of bridge rectifier diode drop voltages are neglected.

With resistor Rp in place, the high frequency voltage developed across A and G or B and G is also reflected between the points G and P (+) or between G and P (−) where P (−) is circuit ground. Thus, by placing a sensing circuit between G and P (+) or, G and P (−), the amount of current flow through Rp can be detected.

BRIEF DESCRIPTION OF THE DRAWINGS

FIG. 1 is a block diagram of an off-line power inverter.

FIG. 2A is a circuit diagram of a full-wave rectifier for use with the power inverter of FIG. 1.

FIGS. 2B and 2C are voltage waveforms occurring at different points in the rectifier of FIG. 2A.

DETAILED DESCRIPTION OF PREFERRED EMBODIMENTS

Figure 3:
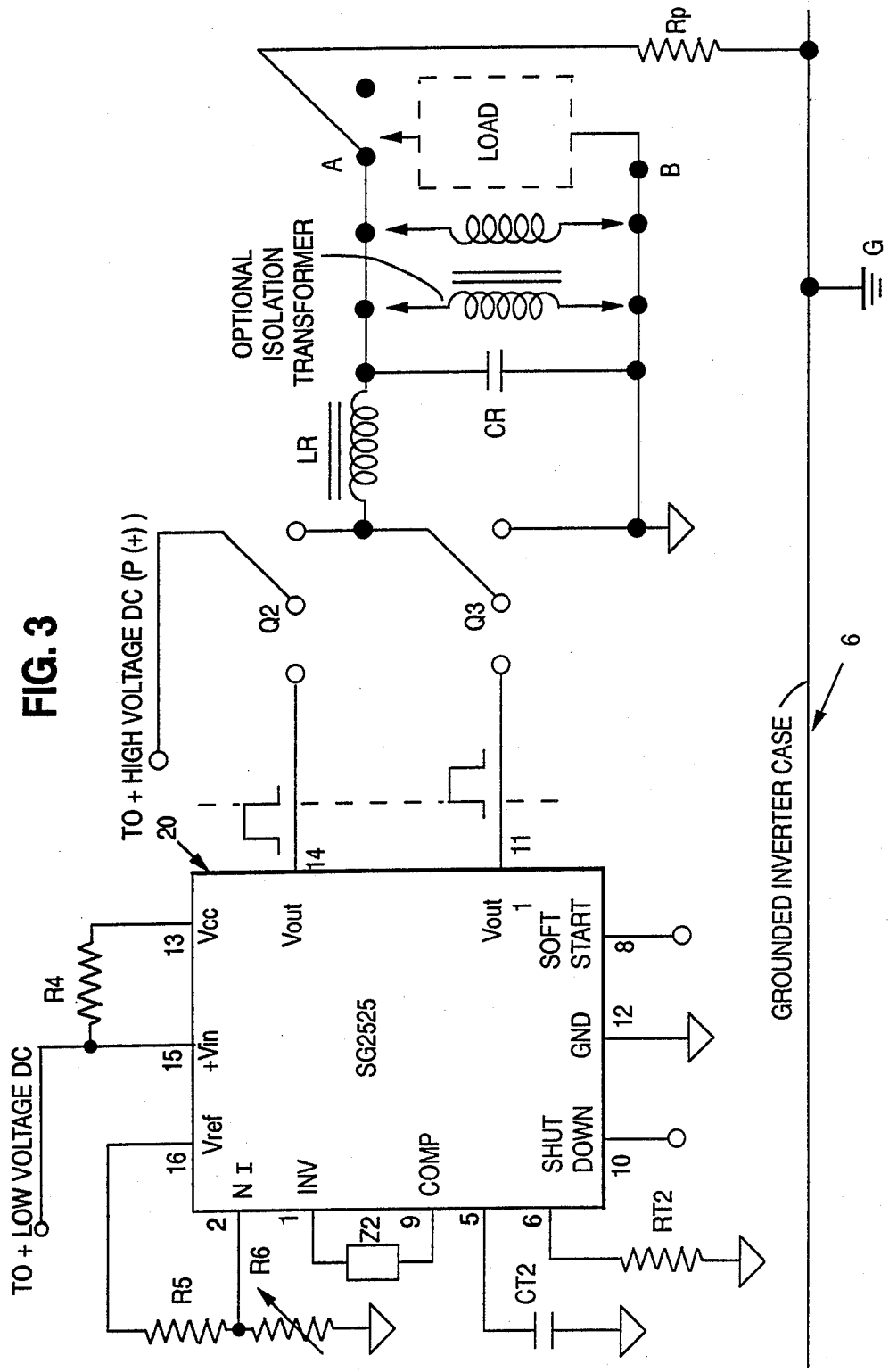
FIG. 3 is a block diagram of an off-line resonant inverter utilizing an integrated circuit, controller circuit.
Figure 4:
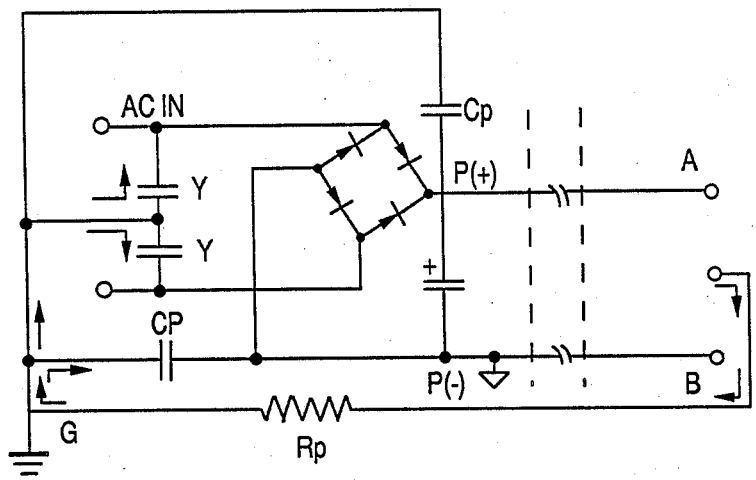
FIG. 4 is a schematic diagram indicating possible current flow paths in the power inverter of FIG. 1 in response to a person inadvertently contacting one of the inverter output terminals and the inverter chassis with the load disconnected.
Figure 5:
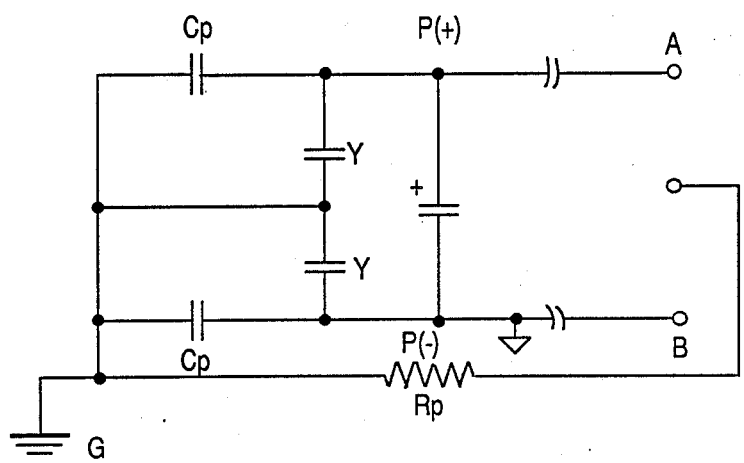
FIG. 5 is a simplified schematic diagram of the circuitry of FIG. 4.
Figure 6:
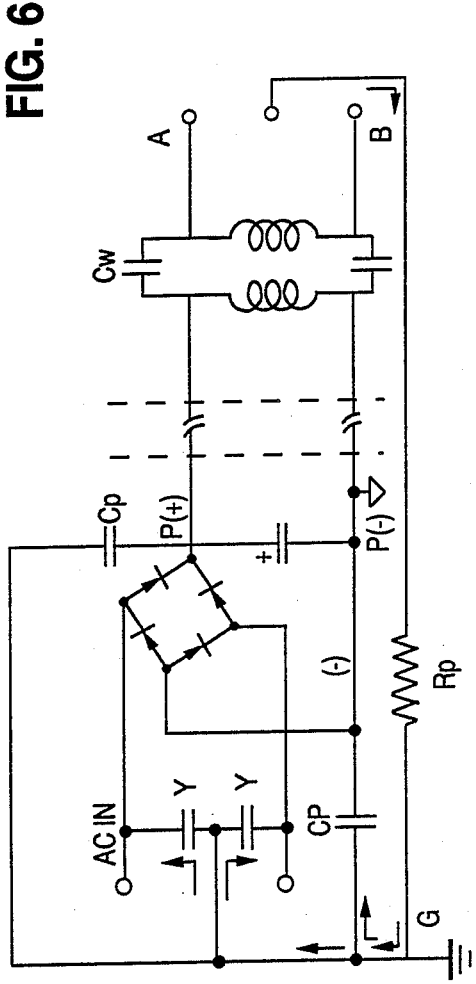
FIG. 6 is a schematic diagram corresponding to that of FIG. 4 and including an output transformer for the power inverter.
Figure 7:
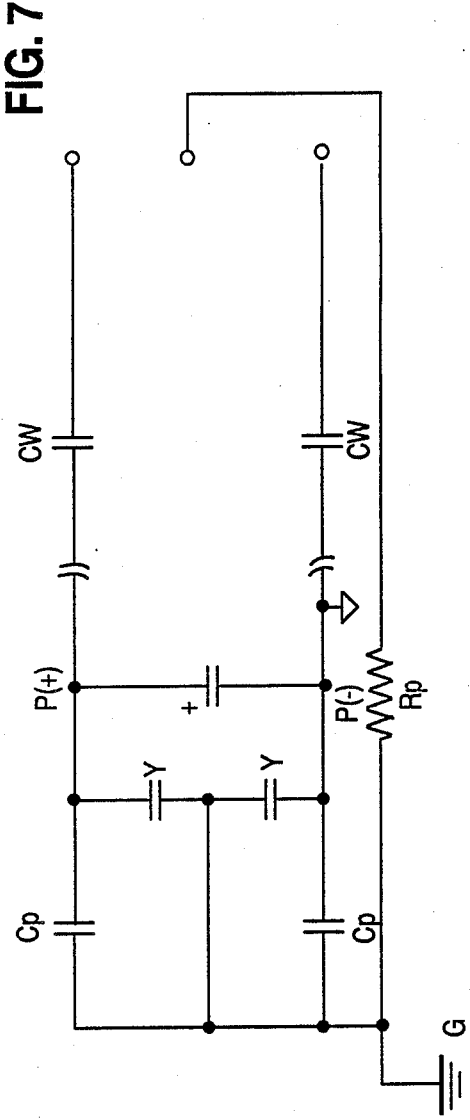
FIG. 7 is a simplified schematic diagram of the circuitry of FIG. 6.

Reference should be made to the drawing where like reference numerals and letters refer to like circuit elements.

As mentioned above, by placing a sensing circuit between G and P (+) or P (−), the amount of current flow through Rp can be detected. A simple resistor sensor circuit is not suitable in the circuitry of FIG. 1 because, during normal operation, a continuous high voltage pulsating DC potential exists between G and P (+) or, G and P (−). The frequency of this pulsating high voltage DC is determined by the input AC, as discussed hereinbefore with respect to FIG. 2. However, if such pulsating voltage is not present, a simple resistor circuit would be suitable.

Figure 8:
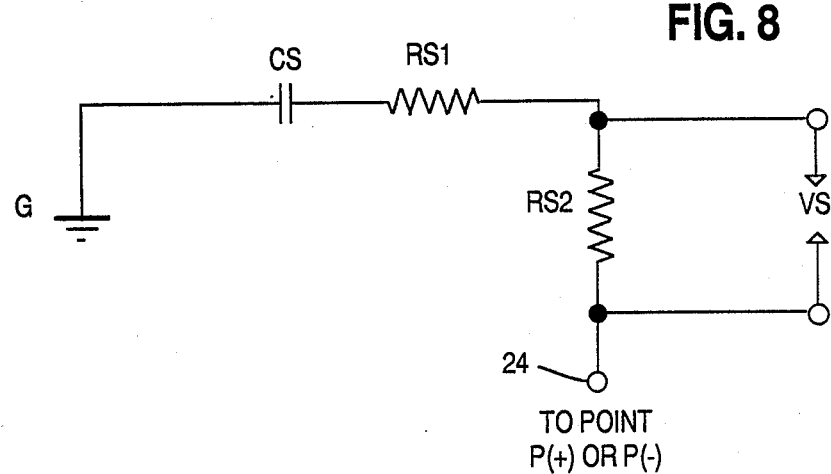
FIGS. 8 and 9 are schematic diagrams of illustrative sensing circuits for use with the invention.
Figure 9:
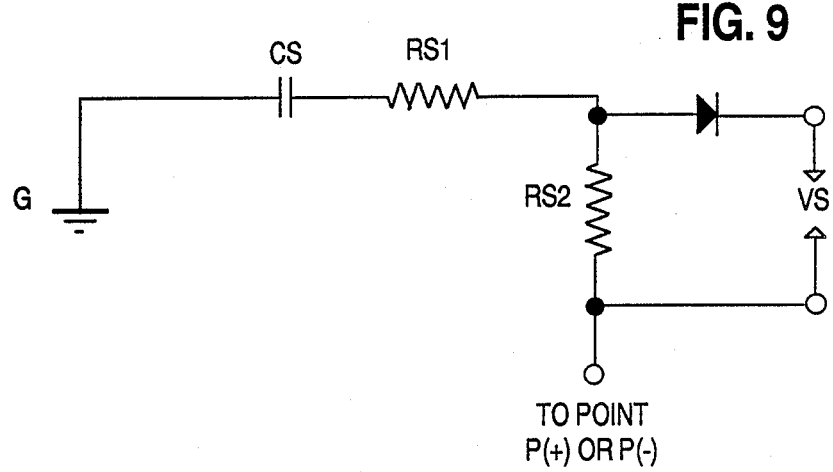

On the other hand, high frequency AC voltage sensing can be accomplished by a capacitor and resistors combinations as shown in FIGS. 8 and 9. FIG. 9 converts the high frequency AC signal into a DC signal. In either case, the amount of sense voltage VS is determined by: (1) the inverter frequency (fi), (2) Rp, (3) CS, (4) RS1, and (5) RS2. The impedance (XCS) offered by CS is given by, $XCS = 1/(2\pi \cdot fi \cdot CS)$. As an example, assume $fi = 30,000$ Hz, input line frequency $fac = 60$ Hz, $CS = 0.0033$ microfarad. Then, at the inverter frequency, $XCS = 1607$ ohms. But, at the input AC frequency, $XCS = 803,500$ ohms, which is 500 times higher.

As a consequence, the 60 Hertz AC input signal will be attenuated 500 times compared to a 30,000 Hertz AC signal. Thus, for the circuits of FIGS. 8 and 9, one can easily detect the high frequency signal even though a continuous 60 Hertz pulsating DC signal exists between points G and P (+) or G and P (−).

Figure 10:
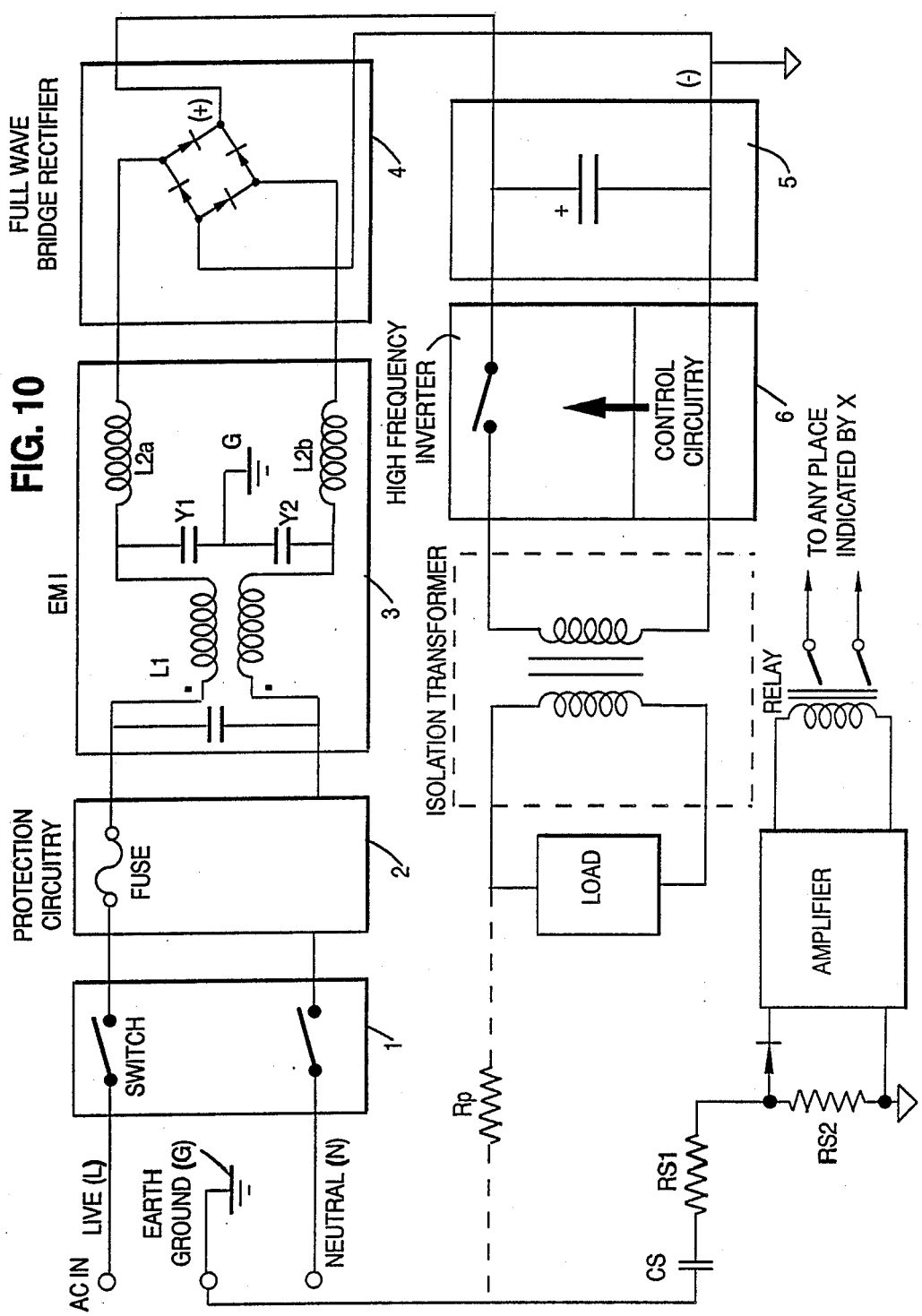
FIG. 10 is a block diagram of an illustrative connection of the sensing circuitry of FIG. 9 with the power inverter of FIG. 1 where possible locations of relays for disabling the inverter are illustrated.

The high frequency signal that is detected by the circuits of FIGS. 8 and 9 is a function of the high frequency current that is flowing between power inverter output terminal and ground, when the resistor Rp is placed between them. Thus, the detected signal can be used, for example, to turn on a relay or some other switch to disenable the power inverter output (FIG. 10) temporarily or permanently in order to avoid that current flow. The relay can be placed in any location indicated by X.

In an another and preferred embodiment of the invention, either of the sensing circuits of FIGS. 8 or 9, for example, may replace either the Y1 or the Y2 capacitor of FIG. 1 where preferably the Y2 capacitor would be replaced with one of the sensing circuits. Assuming the Y2 capacitor is replaced, the value of CS of FIGS. 8 or 9 could be preferably exactly the same as the remaining Y1 capacitor. In particular, if the Y2 capacitor were replaced by the sensing circuitry of FIG. 8, the earth ground portion of the FIG. 8 circuitry would correspond to the earth ground portion of the FIG. 1 circuitry while the terminal 24 of FIG. 8 would correspond to the terminal 26 of FIG. 1. Thus, in this embodiment, the sensing circuitry serves not only its sensing function as described above, but also serves the EMI suppression function formally performed by the replaced Y1 capacitor.

Figure 11A:
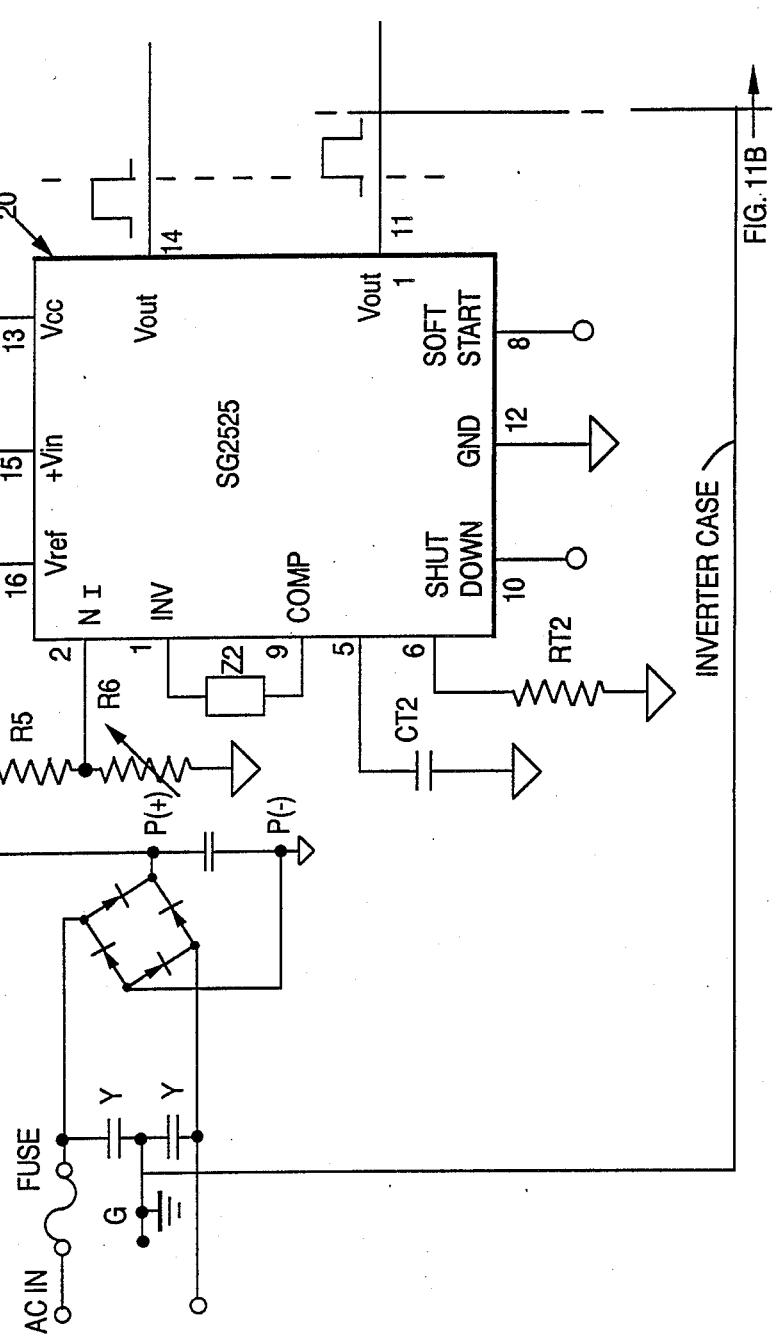
FIG. 11 is a block diagram illustrating how the power inverter of FIG. 1 may be used to drive a fluorescent lamp.
Figure 12A:
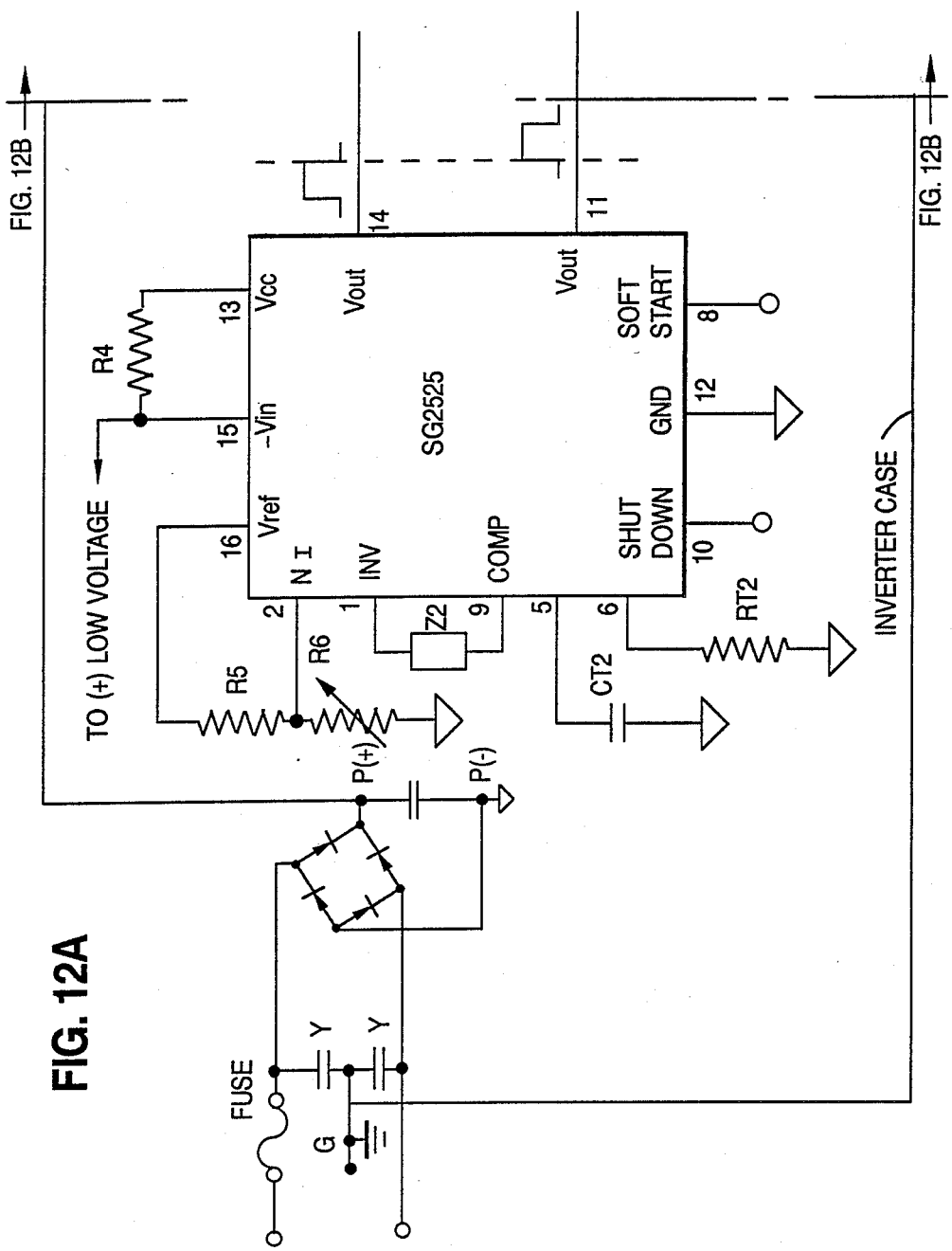
FIG. 12 is a schematic diagram corresponding to FIG. 11 and further illustrating the dangerous condition that may exist when a person is in contact with one of the output terminals of the inverter and earth ground while the fluorescent lamp is disconnected.
Figure 12B:
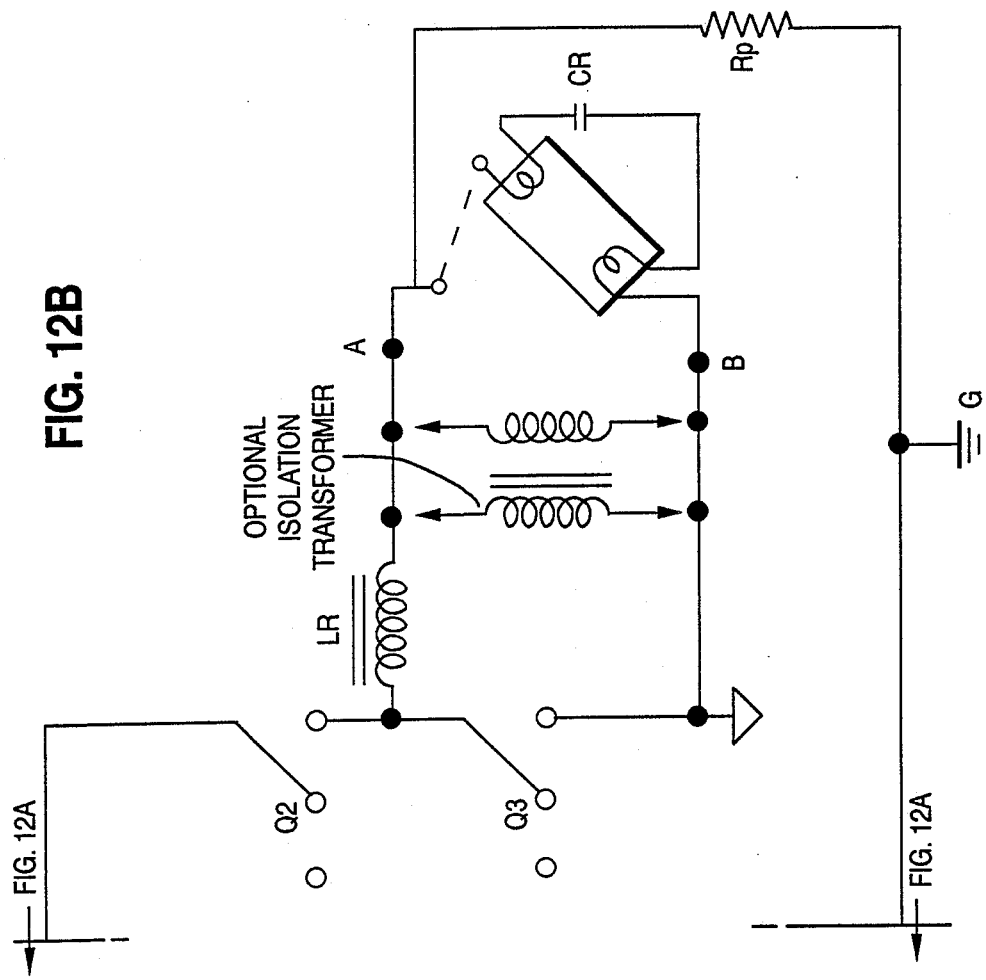

Further, the detected signal via the circuits described by FIGS. 8 and 9 can also be used to regulate or limit current between the inverter output and ground when they are short circuited or connected by a resistor. As an example, refer to the resonant inverter of FIG. 3. As discussed above, the resonant inverter can drive a load such as a fluorescent lamp. This is shown in FIG. 11. During installation or removal of a lamp a person can accidentally be in contact with terminal A and the grounded inverter case simultaneously. In this situation, the person can be replaced by an equivalent resistor of 500 ohms. This is shown in FIG. 12. According to Underwriters Laboratories Inc., USA, safety standards UL 935, Paragraph 20.5, when a 500 ohm resistor is placed between the terminal A and ground, then the maximum acceptable peak current through the 500 ohms resistor must be limited to 43.45 milliamperers, when the inverter frequency is 10,000 Hertz or more. This corresponds to a maximum peak voltage of 21.7 volts across the 500 ohm resistor. By using the detection circuits of FIGS. 8 or 9, one can easily achieve this goal. This is shown in FIG. 13.

Figure 13A:
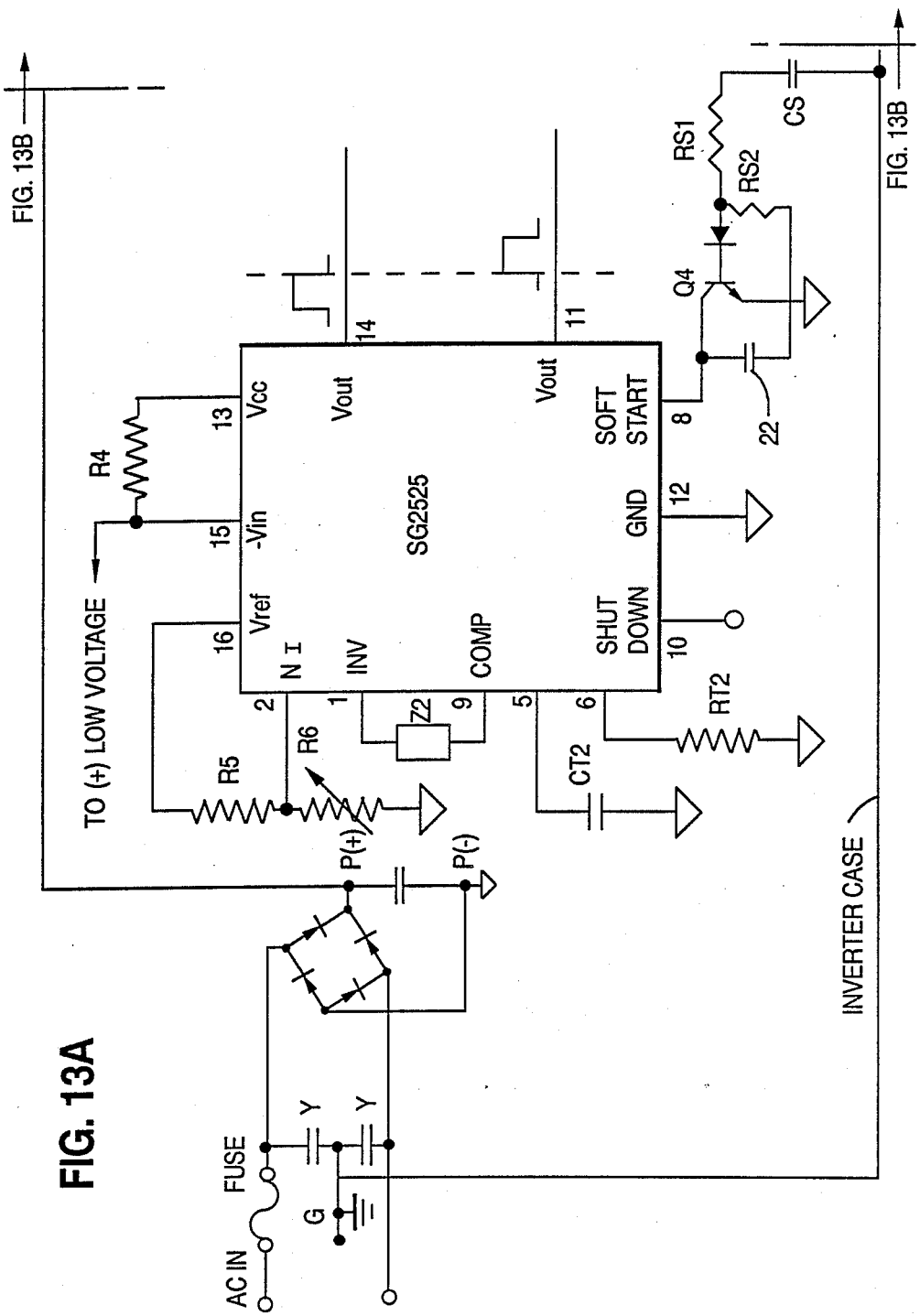
FIG. 13 is a schematic diagram corresponding to FIG. 12 and further illustrating sensing circuitry for disabling, if necessary, the controller for the power inverter.
Figure 13B:
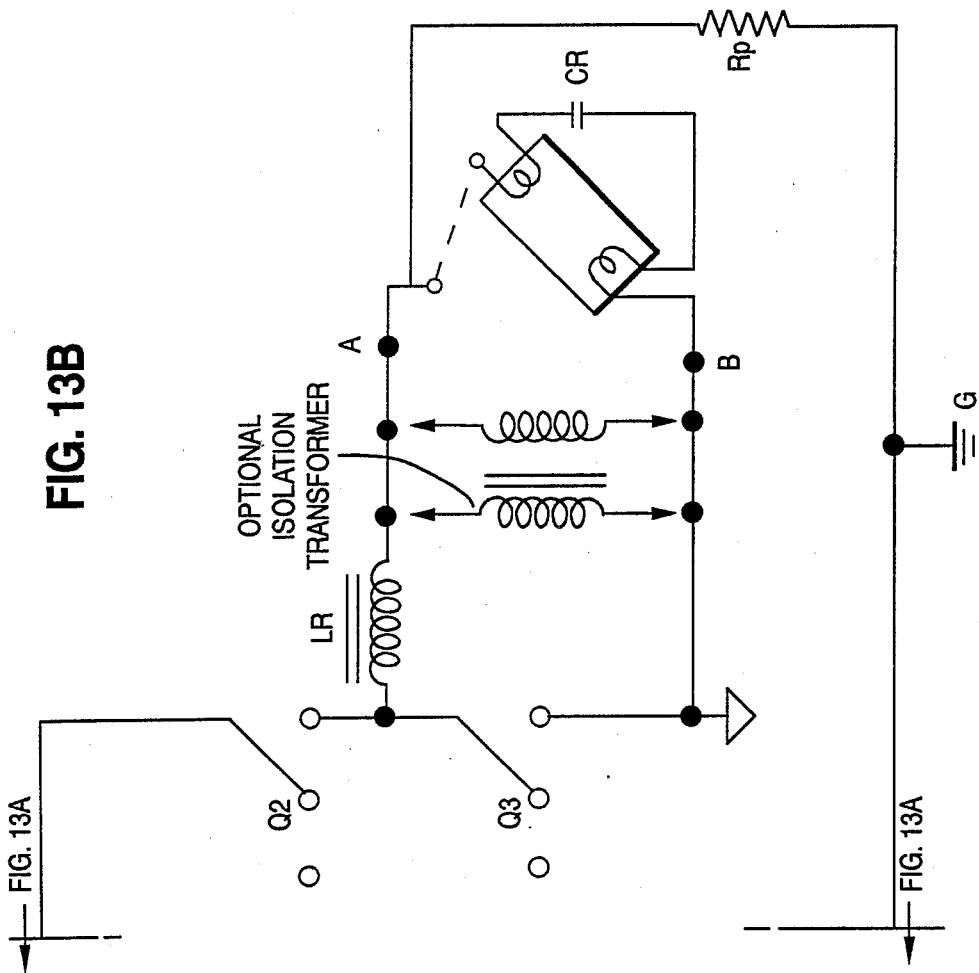

In FIG. 13, the values of CS, RS1 and RS2 can be arranged such that as soon as the peak voltage across Rp reaches 21.7 volts, the voltage that develops between the base and emitter of a transistor Q4 is enough to turn on the transistor where soft start capacitor 22 is connected across the collector and emitter of Q4. Turning Q4 on causes a pull-down of the soft start pin 8 of the IC SG2525. This, in turn, causes an immediate shutdown of the output drive pulses from pin 11 and pin 14. Power inverter switches Q2 and Q3 stop functioning. In this situation no current flows through Rp, Q4 turns off. But, when Q4 turns off then SG2525 starts working again. Turns on Q2 and Q3. Current starts flowing through Rp and turns on Q4 again as soon as the voltage across Rp reaches 21.7 volts and the cycle continues. Shut-down of the IC SG2525 can also be accomplished in a similar manner by applying the signal to the shut-down pin 10 of the IC instead of to pin 8.

What is claimed is:

1. Circuitry for limiting a high frequency current through a load comprising:
   a DC voltage source having at least two output terminals where the DC voltage occurs at a first of the terminals and the second of the output terminals is connected to a circuit ground;
   inverter means for converting the DC voltage to said high frequency current, the inverter means having at least two output terminals where one of said output terminals is connected to said circuit ground;
   a chassis containing said voltage source and said inverter means where the chassis is connected to an earth ground and where said earth ground and said circuit ground are at different electric potentials;
   sensing means connected between said earth ground and one of said two output terminals of the voltage source to establish a current path from the earth ground to said one output terminal of the voltage source to thus monitor any high frequency current which may flow through a resistance connected between one of the output terminals of the inverter means and said earth ground; and
   limiting means responsive to said sensing means for limiting the high frequency current through the resistance in response to the current through the resistance exceeding a predetermined limit.

2. Circuitry as in claim 1 where said resistance simultaneously contacts said one output terminal of the inverter means and said earth ground.

3. Circuitry as in claim 1 where said DC voltage source includes an AC signal source and rectifier means for converting the AC signal to said DC voltage.

4. Circuitry as in claim 3 including suppressing means connected between said AC signal source and said DC voltage source for suppressing high frequency electromagnetic interference generated by said inverter means where said suppressing means includes at least one capacitor means connected between said AC signal source and said earth ground where the impedance of the capacitor is such that said high frequency electromagnetic interference is shunted to earth ground while the AC signal is not so shunted due to the lower frequency of the AC signal with respect to high frequency signal output of the inverter means.

5. Circuitry as in claim 4 where said sensing means includes said suppressing means whereby the capacitor of the suppressing means passes the high frequency current through the resistance while, at the same time, it suppresses the lower frequency AC signal so that said high frequency current through the resistance may be accurately monitored.

6. Circuitry as in claim 5 where said AC signal source includes a live wire and a neutral wire and said suppressing means includes at least two capacitors, the first of which is connected between the neutral wire and said earth ground and the second of which is connected between the live wire and the earth ground.

7. Circuitry as in claim 6 where said one capacitor is said first capacitor.

8. Circuitry as in claim 6 where said one capacitor is said second capacitor.

9. Circuitry as in claim 1 where said inverter means is a resonant inverter.

10. Circuitry as in claim 1 where said sensing means includes threshold means for establishing the predetermined limit of current which can pass through said resistance.

11. Circuitry as in claim 10 where said threshold means establishes said predetermined current limit through the resistance based on (a) the resistance being connected between one of said two output terminals of the inverter and said earth ground and (b) the load being disconnected to at least one of the output terminals of the inverter means.

12. Circuitry as in claim 11 where said threshold means includes a voltage divider.

13. Circuitry as in claims 10 or 11 where said load is a fluorescent lamp.

14. Circuitry as in claim 1 where said inverter means includes an output transformer.

15. Circuitry as in claim 1 where said inverter means includes control means for switching the inverter from one state to another and where the control means includes disable means for disabling the inverter means, said disable means being responsive to the sensing means to disable the inverter and thus limit the current through the resistance to a value less than said predetermined limit.

16. Circuitry as in claim 1 where said limit means includes switching means in circuit with said DC voltage source and said inverter means for disabling the latter means in response to said current through the resistance exceeding said predetermined limit.

17. Circuitry as in claim 16 where said switching means includes at least one relay.

* * * * *